United States Patent
Goloshchuk

(10) Patent No.: US 12,014,337 B2
(45) Date of Patent: Jun. 18, 2024

(54) INFORMATION TRANSACTION INFRASTRUCTURE

(71) Applicant: Mastercard International Incorporated, Purchase, NY (US)

(72) Inventor: Vladimir Goloshchuk, Purchase, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 975 days.

(21) Appl. No.: 15/417,587

(22) Filed: Jan. 27, 2017

(65) Prior Publication Data

US 2017/0221022 A1 Aug. 3, 2017

(30) Foreign Application Priority Data

Jan. 29, 2016 (EP) .................................... 16153519

(51) Int. Cl.
*G06Q 20/06* (2012.01)
*G06Q 20/08* (2012.01)
(Continued)

(52) U.S. Cl.
CPC ....... *G06Q 20/0655* (2013.01); *G06Q 20/065* (2013.01); *G06Q 20/0855* (2013.01);
(Continued)

(58) Field of Classification Search
CPC ............. G06Q 20/0655; G06Q 20/065; G06Q 20/0855; G06Q 20/3674; G06Q 20/3678; G06Q 20/401
(Continued)

(56) References Cited

U.S. PATENT DOCUMENTS

| 2010/0111276 | A1† | 5/2010 | Hartley et al. |
| 2014/0039942 | A1 | 2/2014 | Groarke et al. |

(Continued)

FOREIGN PATENT DOCUMENTS

| CN | 101595505 A | 12/2009 |
| CN | 102013064 A | 4/2011 |

(Continued)

OTHER PUBLICATIONS

Anonymity of Bitcoin Transaction, An Analysis of Mixing Services (Year: 2013).*

(Continued)

*Primary Examiner* — Neha Patel
*Assistant Examiner* — Yin Y Choi
(74) *Attorney, Agent, or Firm* — Panitch Schwarze Belisario & Nadel LLP

(57) ABSTRACT

A method of transferring information with verification from a first party to a second party using suitably programmed computing apparatus is described. Information from a first party private address to a first party public address. This information is then sent from the first party public address to a second party address. The information is also provided for public recordal on a block of a block chain for verification. The first party private address is not communicated to the second party but the first party public address is communicated to the second party. This approach is particularly suitable for transfer of cryptocurrency, as it allows for an effective refund mechanism. Computing apparatus and application software adapted to implement this approach is also described.

18 Claims, 6 Drawing Sheets

(51) Int. Cl.
*G06Q 20/36* (2012.01)
*G06Q 20/40* (2012.01)

(52) U.S. Cl.
CPC ..... *G06Q 20/3674* (2013.01); *G06Q 20/3678* (2013.01); *G06Q 20/401* (2013.01); *G06Q 2220/00* (2013.01)

(58) Field of Classification Search
USPC .......................................................... 705/67
See application file for complete search history.

(56) References Cited

U.S. PATENT DOCUMENTS

| | | | |
|---|---|---|---|
| 2015/0227897 A1 | 8/2015 | Loera | |
| 2015/0262137 A1* | 9/2015 | Armstrong | |
| 2015/0287026 A1* | 10/2015 | Yang et al. | |
| 2015/0324764 A1* | 11/2015 | Van Rooyen et al. | |
| 2015/0348017 A1* | 12/2015 | Allmen | |
| 2015/0356524 A1 | 12/2015 | Pennanen | |
| 2015/0365283 A1* | 12/2015 | Ronca et al. | |
| 2016/0125403 A1* | 5/2016 | Hu et al. | |
| 2016/0203572 A1* | 7/2016 | McConaghy et al. | |
| 2017/0078493 A1* | 3/2017 | Melika et al. | |
| 2017/0109748 A1* | 4/2017 | Kote | |
| 2017/0124534 A1* | 5/2017 | Savolainen | |

FOREIGN PATENT DOCUMENTS

| | | | |
|---|---|---|---|
| EP | 3188402 | † | 7/2017 |
| WO | 2008/094799 A1 | | 8/2008 |
| WO | 2015144971 A1 | | 10/2015 |
| WO | WO 2015/144971 A1 | | 10/2015 |

OTHER PUBLICATIONS

Bitcoin wallets: How to protect your digital currency (Year: 2014).*
Search Report dated Jul. 21, 2016, by the European Patent Office for Application No. 16153519.0.
https://en.bitcoin.it/wiki/Main Page, retrieved on Jan. 27, 2017, 2 pages.
https://developer.android.com/guide/topics/connectivity/nfc/hce.html, retrieved on Jan. 27, 2017, 15 pages.
https://en.bitcoin.it/wiki/Alternative chain, retrieved on Jan. 27, 2017, 10 pages.
International Search Report and Written Opinion issued by the International Search Authority dated Mar. 2, 2017 in corresponding PCT Application No. PCT/US2017/015070 (10 pages).
Office Action (Third Office Action) dated Apr. 7, 2021, by the China National Intellectual Property Administration in corresponding Chinese Patent Application No. 201780006931.4 and an English Translation of the Office Action. (26 pages).
Hearing Notice, dated Mar. 18, 2024, issued in corresponding Indian Application No. 201817004151, 3 pages.

* cited by examiner
† cited by third party

INFORMATION TRANSACTION INFRASTRUCTURE

FIELD OF DISCLOSURE

This disclosure relates generally to an information transaction infrastructure. In embodiments, the disclosure relates to an infrastructure enabling the use of users accounts adapted for effective performance of transactions and provision of added services to users particularly useful for use with virtual currencies such as cryptocurrencies.

BACKGROUND OF DISCLOSURE

A virtual currency (also known as a digital currency) is a medium of exchange implemented through the Internet generally not tied to a specific government-backed "flat" (printed) currency such as the US dollar or the Euro and typically designed to allow instantaneous transactions and borderless transfer of ownership. The best known type of virtual currency is cryptocurrency, in which cryptography is used to secure transactions and to control the creation of new units. Several cryptocurrencies exist, of which the best known is Bitcoin. Bitcoin is decentralized in the sense that it has no central point of control. Transactions are recorded on a public ledger in the form of a block chain—a distributed database maintaining a continuously growing list of transaction data records. Cryptographic processes are used to harden the block chain against tampering and revision. Decentralization and a public ledger are typical features of cryptocurrencies.

Virtual currency is one type of electronic money—more generally, electronic money is any electronically stored money balance such as a money balance stored on a physical card with an embedded processor or adapted for transfer over a computer network. Electronic money based on a flat currency is typically centralized in that there is a central point of control over the money supply. PayPal is an example of an electronic money system with centralized control, and systems such as Google Wallet and Apple Pay enable electronic money transactions using mobile devices.

While the public ledger mechanism used by cryptocurrencies is effective to prevent double spending of value units, the verification process is relatively resource intensive, meaning that far fewer transactions may be performed than in a centralized system. As transactions are public and irreversible, it is challenging to achieve all the features of centralized electronic money systems—in particular, processing of refunds can be particularly challenging.

It would be desirable to achieve a virtual money infrastructure that allowed use of cryptocurrencies with a range of services comparable to that achievable with centralized electronic money systems.

SUMMARY OF DISCLOSURE

In a first aspect, the disclosure provides a method of transferring information with verification from a first party to a second party using suitably programmed computing apparatus, the method comprising: sending information from a first party private address to a first party public address; and sending said information from the first party public address to a second party address, wherein the information is provided for public recordal on a block of a block chain for verification; wherein the first party private address is not communicated to the second party but the first party public address is communicated to the second party.

The first party private address may be provided by a service provider acting for the first party, and in embodiments the service provider may provide both the first party private address and the first party public address.

The service provider may provide the first party private address and a plurality of private addresses for other parties in a logically protected address space. The first party private address may be kept private to the first party and the service provider.

The information may comprises a cryptocurrency balance. The transfer of information from the first party to the second party can then comprise a cryptocurrency transaction. The method may further comprise a refund of the cryptocurrency transaction by a further transaction from the second party to the first party public address. This may then involve transfer of the cryptocurrency balance from the first party public address to the first party private address.

In a second aspect, the disclosure provides computing apparatus adapted to transfer information with verification on behalf of a first party to a second party, comprising a suitably programmed processor comprising: an address space adapted to host a private address and a public address for the first party; a process to send information from the first party private address to the first party public address; and a process to send said information from the first party public address to a second party address and to provide the information for public recordal on a block of a block chain for verification; wherein the information sending process is adapted to communicate the first party public address and not the first party private address to the second party.

The first party public address may be stored in a logically protected part of the address space. This first party private address is maintained private to the first party and the service provider by a cryptographic protocol.

The information may comprise a cryptocurrency balance and the transfer of information then comprise a cryptocurrency transaction. The address space may comprise a shared wallet. The process for sending information may then be adapted to receive a refund of the cryptocurrency transaction and to transfer the refund from the first party public address to the first party private address.

In a third aspect, the disclosure provides a shared wallet client application for use by a first party to transfer information from the first party to a second party using a shared wallet service, the shared wallet client application being adapted to run on a computing device of the first party to: establish a secure communication path with the shared wallet service; authorise a transfer of information from a first user private address in the shared wallet to a first user public address in the shared wallet; and authorise sending of the information from the first user public address to a second user address wherein the information is provided for public recordal on a block of a block chain for verification.

BRIEF DESCRIPTION OF FIGURES

Embodiments of the disclosure will now be described, by way of example, with reference to the accompanying Figures, of which.

DESCRIPTION OF SPECIFIC EMBODIMENTS

Specific embodiments of the disclosure will be described below with reference to the Figures. Before embodiments of the disclosure are described, a conventional transaction infrastructure architecture will be described with reference to FIG. 1 and an exemplary virtual currency architecture will be described with reference to FIG. 3. A computing device capable of operating in either architecture is shown in FIG. 2.

Figure 1:
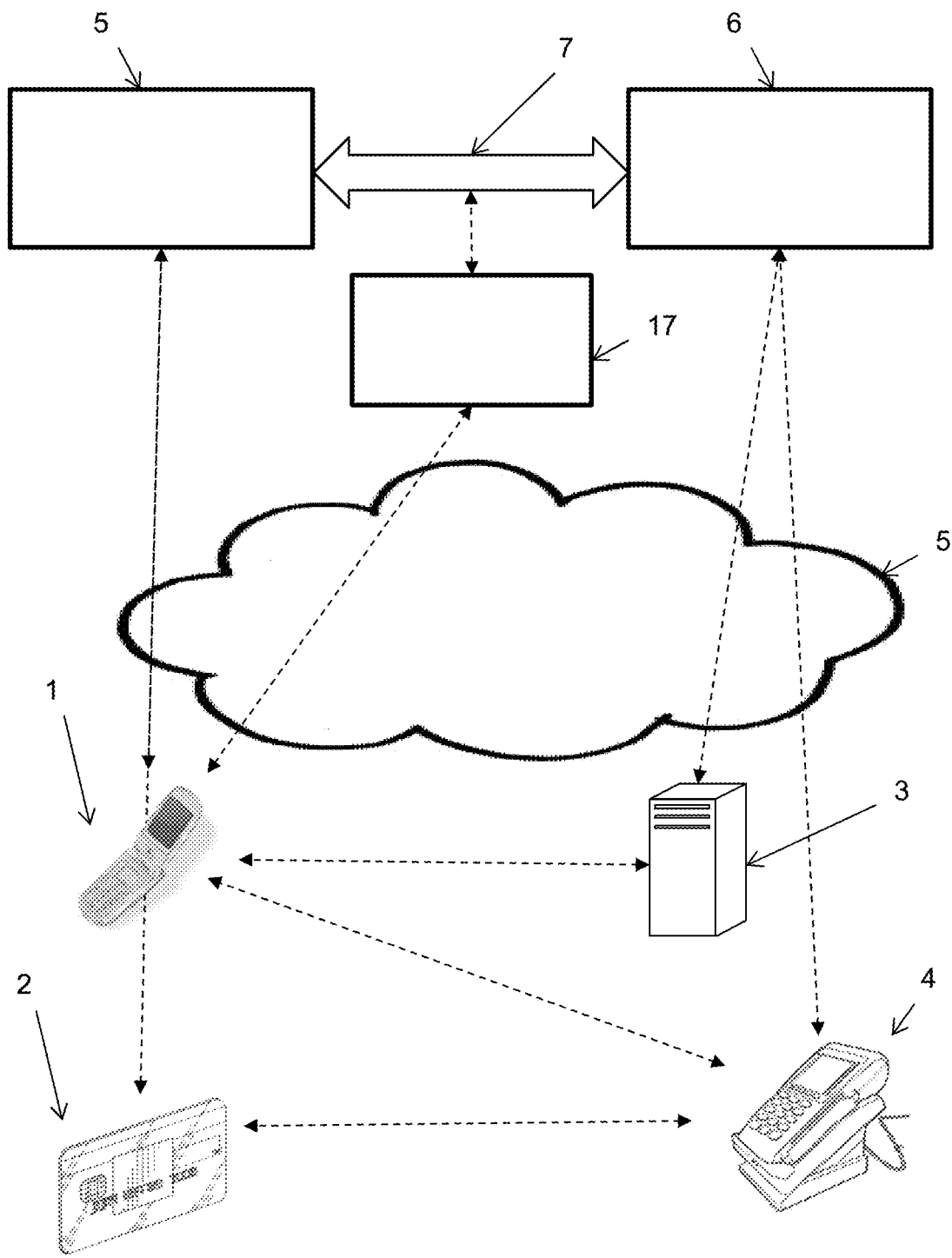
FIG. 1 shows a conventional transaction infrastructure by which transactions are made using payment devices.
Figure 2:
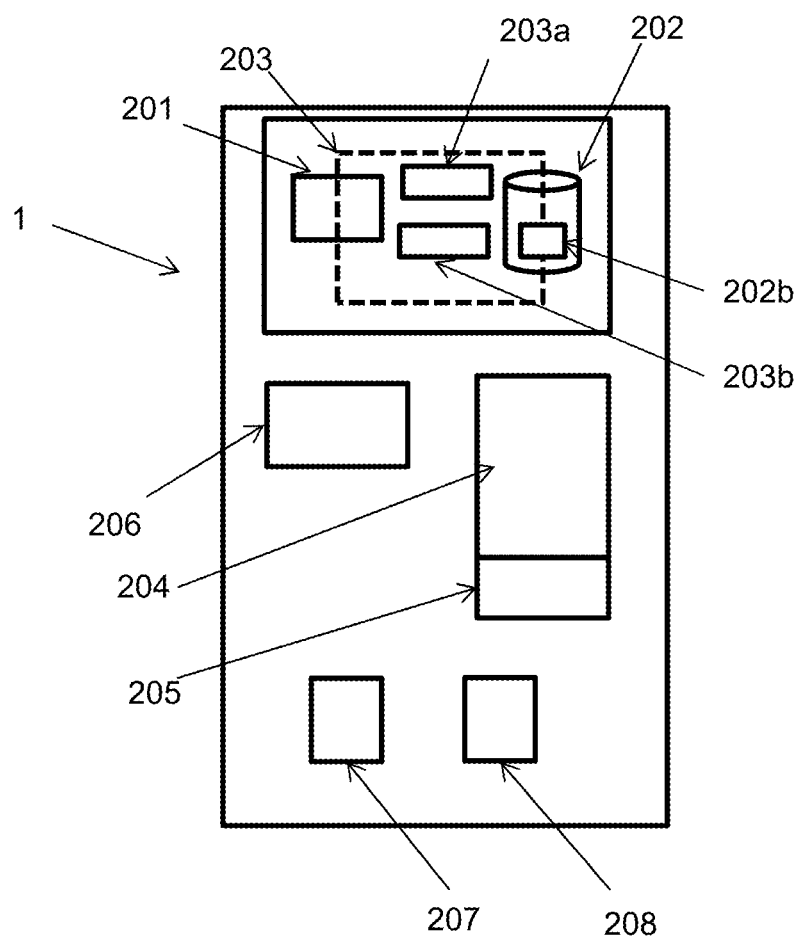
FIG. 2 shows a mobile computing device adapted for use with the infrastructures of FIG. 1 and FIG. 3.

In the conventional transaction infrastructure architecture of FIG. 1, a user (not shown) is provided with a payment device—this may be for example a payment card 2, but it may also be a computing device (such as a mobile phone 1). This computing device comprises a mobile payment application that allows use of a payment card—this may be either as a proxy for an existing physical card, or of an entirely virtual card—in either case, the mobile payment application may be considered to act for a "digitized" card. The mobile payment application comprises a cardlet (held securely, for example in a mobile phone SIM) performing card functions and is associated a wallet allowing user management of cards and accounts.

Mobile phone 1 is also shown as the mechanism for the user to interact with other elements of the system over a suitable network 5—network 5 here represents any appropriate communication network for the communication path indicated, and may be the public internet, a cellular communications network or a private network, depending on the parties involved in the communication and the need for the communication path to be secure.

The payment device is adapted for transaction with a point of interaction (POI) terminal 4 such as a point of sale (POS) terminal or an automated teller machine (ATM) and transactions may also be conducted with an online merchant 3. The payment card 2 will typically include a chip and a wireless transmitter and receiver adapted for short range communication by protocols such as those defined under ISO/IEC 14443—if used as a payment device, the mobile phone 1 (which will typically be adapted to implement short range communication under the NFC standard) must have similar capability and an appropriate payment application installed.

There is a network connection between the user computer devices and a card issuing bank 5 or system associated with the user. A banking infrastructure 7 will also connect the card issuing 5 and the merchant's transaction acquiring bank 6, allowing transactions to be carried out between them. This banking infrastructure will typically be provided by a transaction card provider who provides transaction card services to the card issuing bank 5. The banking infrastructure 7 provides authorization at the time of purchase, clearing of the transaction and reconciliation typically within the same working day, and settlement of payments shortly after that. The banking infrastructure 7 comprises a plurality of switches, servers and databases, and is not described further here as the details of the banking infrastructure used are not necessary for understanding how embodiments of the disclosure function and may be implemented, save to note that associated with the banking infrastructure 7 is a digital enablement service 17 adapted to support use of digitized cards, for example through EMV tokenisation protocols. As noted, the mobile phone comprises a wallet to enable user management of accounts (and, typically, aspects of security of the device)—to avoid confusion with other uses of the term wallet in this specification, this will be referred to as a "payment device wallet" below.

Using this approach, a computing device—shown as a mobile device in FIG. 1, but not necessarily so—is adapted to make "electronic money" transactions using "fiat" money over a conventional transaction infrastructure. Elements of such a computing device are shown in FIG. 2. As will be discussed below, the device shown here can also be used with the virtual currency infrastructure to be described below with reference to FIG. 3.

, FIG. 2 shows a mobile phone 1, though it should be noted that any other portable computing apparatus such as a laptop, notebook or tablet computer can be used as computing apparatus in embodiments of the disclosure. The mobile phone comprises a processor 201 and a memory 202, such that the memory stores and the processor will subsequently run applications (shown generally as application space 203) such as a payment application 203*a*. The mobile phone has a user interface comprising a display 204 and a touchscreen 205 (or other input device) and associated drivers to allow a user to enter data into and view information from the applications 203. The mobile phone 1 also has a cellular telecommunications capability, including subscriber information module (SIM) 206 and wireless communication element 207 together providing the ability to connect to a cellular communications network. The mobile phone may need to perform cryptographic operations in order to interact securely with a POS terminal—this may be achieved more securely by a cryptographic capability within the subscriber information module 206, such as a cryptographic processor in a tamperproof element—another approach is to manage without a secure element by using Host Card Emulation (HCE). Implementation of HCE in Android is discussed on the world wide web at developer.android.com/guide/topics/connectivity/nfc/hce.html—other operating systems are developing or have developed similar approaches. In other kinds of computing devices other forms of tamper resistant hardware may be used to increase the security of cryptographic processing and sensitive data. The mobile phone is here shown as having a local networking element 208 as well, in order to establish a short range wireless network connection—however, in other embodiments the mobile phone 1 may only be able to make network connections through a cellular telecommunications network. Where the computing device is not a mobile phone, then while a network connection is needed to enable communication between the computing device and other system elements, this need not involve cellular telecommunications. For example, the computing device may be a tablet computer without cellular telecommunications capability but capable of making a local wireless network connection.

The mobile phone of FIG. 2 also comprises in this case a cryptocurrency client 203*b* in the application space 203 and a cryptocurrency wallet 202*b* in the memory 202—these are shown here in the main application space, but one or both could for additional security be located in a secure element such as the SIM. These will be discussed further in the context of FIG. 3, which provides a representation of an exemplary existing virtual currency infrastructure.

Figure 3:
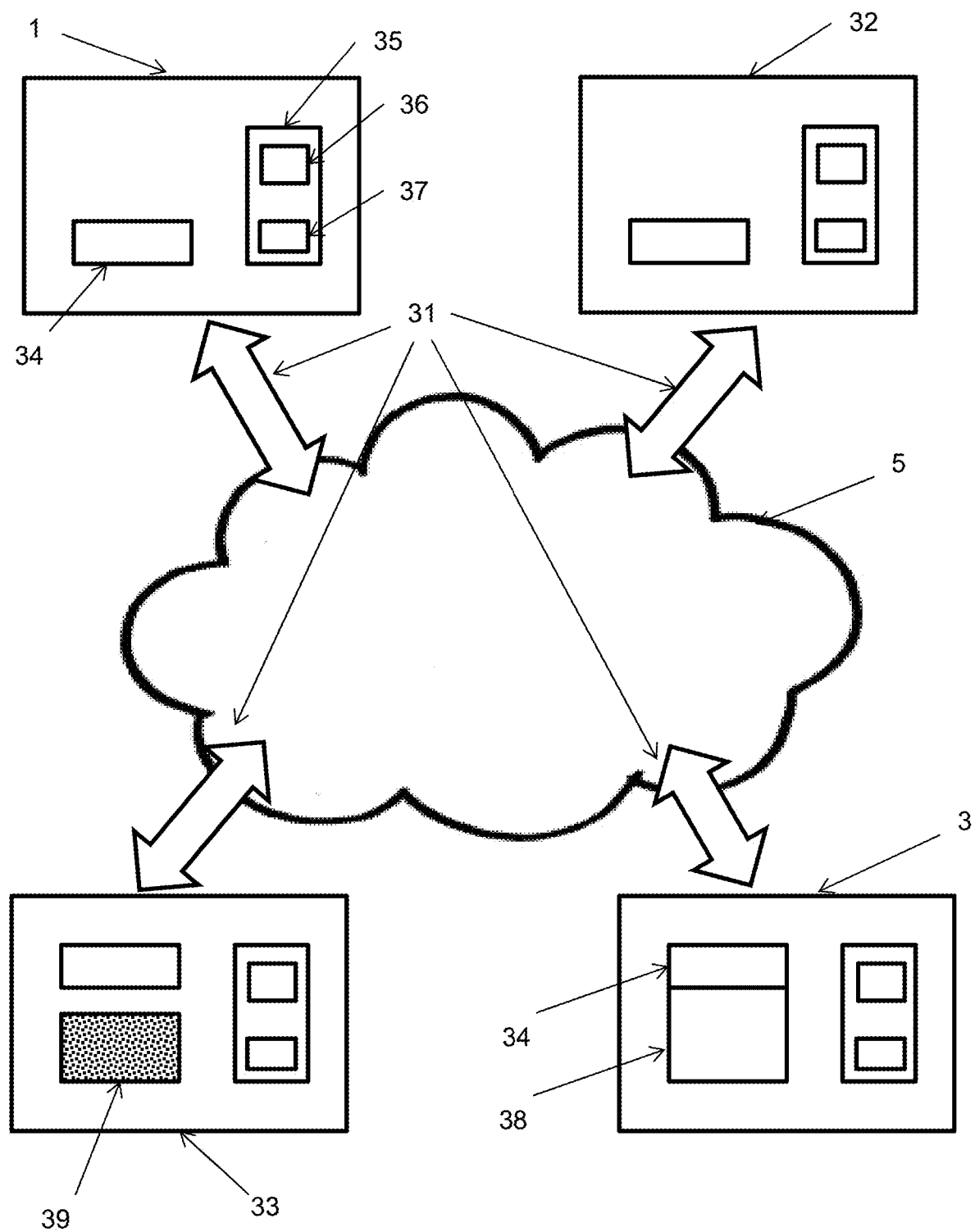
FIG. 3 shows an exemplary existing virtual currency infrastructure.

FIG. 3 shows a plurality of computing devices interacting through a peer-to-peer network 31 implemented over the internet 5—in this case, these computing devices include mobile phone 1, along with online merchant 3 and an exemplary user computing device 32 (of very many others in the network). One user computing device 33 is adapted for mining new currency—a process briefly discussed below. Each computing device has a cryptocurrency client 34 for key generation and sending and receiving payments and a cryptocurrency data directory 35. The data directory comprises block chain information 36 and the user's cryptocurrency wallet 37. Other elements shown are the online merchant's storefront application 38, shown adjacent to the merchant's cryptocurrency client 34 as the two interact together to allow cryptocurrency payments to be made to the merchant 2. The other element shown is a mining engine 39 shown as part of the mining user computing device 33—again, mining user computing device 33 is representative of many others on the system. The roles of each element of the system will be briefly described below, but for detailed description of individual cryptocurrency systems the skilled person will consult appropriate resources—for example, the Bitcoin wiki found at https://en.bitcoin.it/wiki/Main_Page, entitled "entitled "Welcome to the Bitcoin Wiki", herein incorporated by reference.

Information personal to the user is kept in the cryptocurrency wallet 37. This contains one or more addresses for the user—these are alphanumeric identifiers that represent a possible destination for a cryptocurrency payment to that user. A user can typically generate a new address at no cost—typically an address is a single use token for a specific transaction. The wallet also contains the user's cryptographic keys. An address is a public key corresponding to one of the user's private keys—the user can generate new key pairs as needed from a base key. The wallet also contains the user's accounts—when cryptocurrency is received, it is assigned to an account. Other cryptocurrency structures are possible (for example, addresses and accounts can be conflated in some cryptocurrency types), but the exemplary approach described here is widely used.

Block chain information 36 is public and is shared on a peer-to-peer basis, but provides a mechanism for verification of transactions as described below. The block chain itself is a transaction database shared by all nodes of the network—a full copy of the block chain for a cryptocurrency contains every transaction ever executed, allowing the determination of values associated with any given address. The blocks are chained, as each block contains a hash of the previous block. Once a block is mature in the chain, it is not practical to modify it computationally because each later block would have to be regenerated.

A typical transaction involving a payment from Alice to Bob operates in the following way. Bob creates a new address using the cryptocurrency client, and provides the address (a public key for a private key held by Bob) to Alice as a destination for the payment. Alice makes the transaction using her cryptocurrency client by indicating a payment to the address indicated by Bob from one of her own addresses—this is done by signing a transaction request with her private key for the address, the public key being usable to establish that the transaction was sent by Alice to Bob's address. Transaction requests are broadcast across the system for incorporation into a transaction block.

A new block is established by "mining". This is a process in which a candidate for a block is determining the answer to a computationally difficult problem relating to the last block on the chain—typically achieving a particular result for a hash function on that last block using a nonce value, the computational difficulty arising from there being a large number of possible nonce values and no way other than brute force of determining which nonce will achieve the desired result. Once a miner has a valid block, this can be added to the block chain—it will typically contain a reward for the miner (an agreed number of cryptocurrency units assigned to a miner's address). A miner may also be rewarded for transactions added to the new block. The new block chain with the additional added block (including Alice's payment to Bob) is broadcast around the network.

The transaction cannot immediately be considered verified by virtue of its inclusion in the latest block. However, when further blocks are added, it becomes effectively impossible to tamper with the transaction record, as this could only be done by regeneration of subsequent blocks. The transaction can be considered to be verified at this stage.

This type of transaction can be termed "on-the-chain"—it is on the public record and requires the existence of miners to verify it. On-the-chain transactions have a unique wallet address which is the public key string of a cryptographic key pair (generated for example by Elliptic Curve Cryptography). It is also possible to have "off-the-chain" transactions for which there is no public record. This may be achieved with a database (such as MS-SQL, MySQL, Oracle etc.) containing a representation of holdings with balance swaps possible between different holdings retained in the database. For example, Coinbase or Bitstamp does not move bitcoins on the chain for internal reconciliation but just initiates a balance change on their database of users' holdings.

In order to prevent risk of loss, many users prefer to keep cryptocurrency funds offline and to have their use of cryptocurrency mediated by a service. To achieve this, many use shared wallet services from providers such as Bitstamp and Coinbase. These do not change the basic transaction mechanism of the cryptocurrency, but provide transaction services for a user by establishing an address and sending cryptocurrency on behalf of the user, often in return for a flat currency payment (in which case these services are also operating as an exchange).

This type of service provision can have significant benefits for a user, but also has one significant disadvantage. A transaction verified through its establishment in a block chain cannot be voided. If a refund for the transaction is needed, a new transaction is required to send the refund amount back again. If in the case of Alice and Bob, each participant has their own set of addresses, a new transaction can be established. However, if Alice is using a shared wallet service, this mechanism may not be possible—the shared currency service rather than Alice would provide addresses and make transaction requests, so Bob may not be able to provide a refund to Alice directly and no party may have the information available to establish that Alice is entitled to the refund.

For example: Alice stores Bitcoin on a cryptocurrency exchange (such as Bitstamp) account along with other users. The exchange may store Alice's money along Carol's and Dan's money on a single joined account (having one key) such as: 1HBa5ABXb5Yx1YcQsppqwKtaAGFPYe5xzY Alice wishes to purchase something from Bob's store and transfers money from his account to the store by instructing the exchange to initiate this transfer. Bitstamp uses one of the shared addresses, such as 1HBa5ABXb5Yx1YcQsppqwKtaAGFPYe5xzY and initiates the transfer to Bob's store wallet 1PKziWhSbi1RUr8gi546PT6vXAZrMYdoxJ Alice is then informed that the requested product is not in stock and she requests a refund. The money is refunded back to 1HBa5ABXb5Yx1YcQsppqwKtaAGFPYe5xzY. The exchange has received some money, but the balance does not appear on Alice's exchange account as the exchange has no way of knowing who this money was sent to—Alice, Carol or Dan. The exchange does not know how to process these transactions without customers communicating further with the exchange.

Some existing services, such as Coinbase, have attempted to address this issue by manual identification of transactions from addresses, transaction amounts and timestamps, but this places a significant additional burden on the service provider at least. If both Alice and Bob are using shared wallet services, this problem is still greater.

Figure 4:
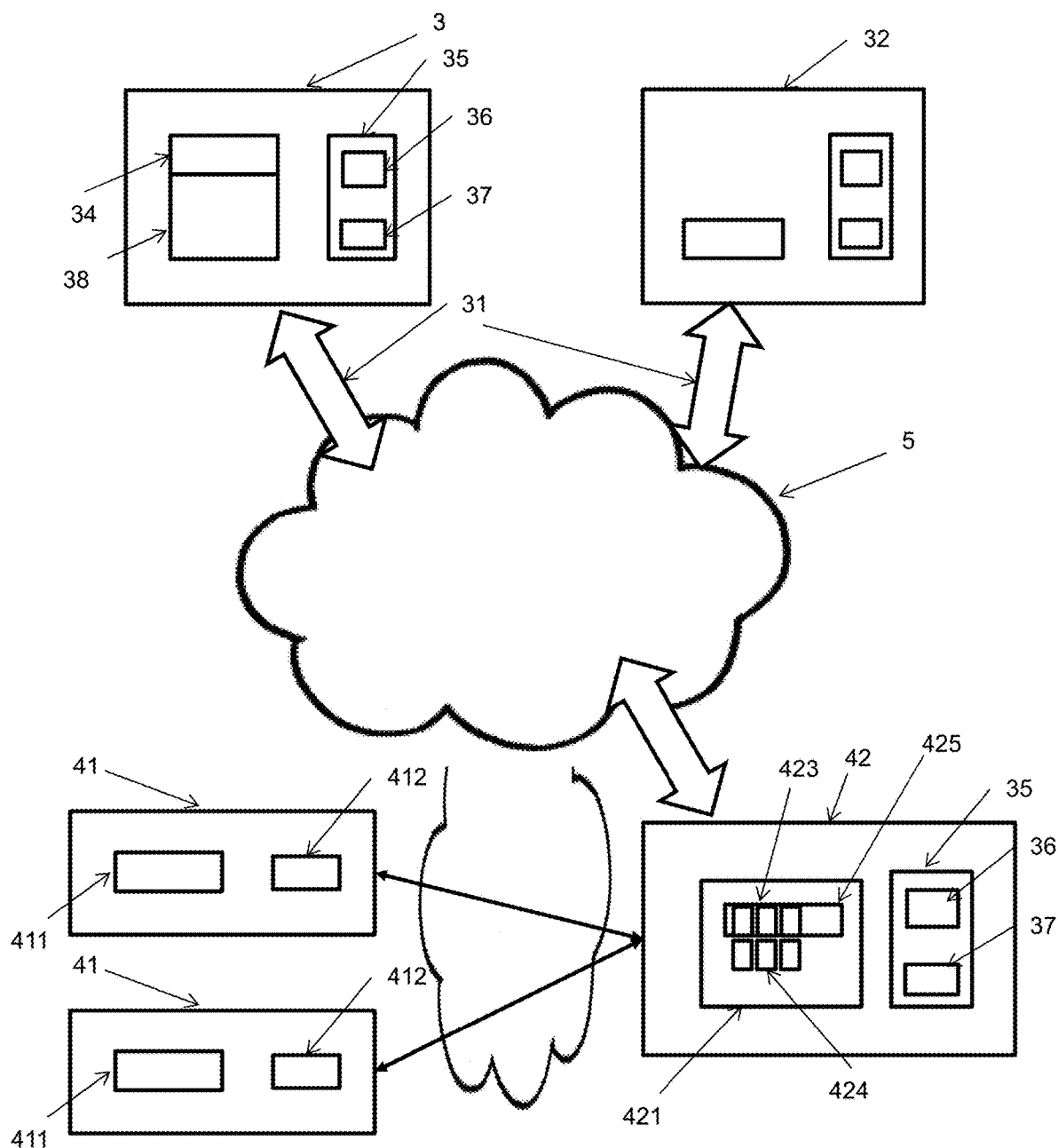
FIG. 4 shows a modified virtual currency infrastructure according to an embodiment of the disclosure.

FIG. 4 illustrates a modification of the architecture of FIG. 3 showing a shared wallet service according to an embodiment of the disclosure. The peer-to-peer network of FIG. 4 may contain all the node types shown in FIG. 3, though for convenience not all types of node shown in FIG. 3 are shown in FIG. 4. FIG. 4 shows two new types of node—a shared wallet service node 42, and a shared wallet user node 41.

The basic principle of the arrangement of FIG. 4 is that a user of the shared wallet service has two types of wallet. Firstly, they have a "public" wallet 424 for on-the-chain publicly visible and verified transactions. The user will make and receive cryptocurrency payments external to the shared wallet service using a public wallet 424. Using this approach, the refund problem can be addressed—a payment received from the public wallet can be refunded by an equal payment back to the public wallet.

The user also has a private wallet 423, which is a logical wallet within the shared wallet service. This private wallet 423 is not publicly visible—it is effectively a private account of the user with the shared wallet service provider. This can be implemented by a cryptographic wallet with private keys shared between the user and the service provider (necessarily trusted by the user using this model). This allows balance transfers within the shared wallet to be executed using standard account reconciliation protocols (because the shared wallet service provider has access) rather than resource intensive block chain based verification.

In the embodiment shown, the shared wallet user node 41 does not itself need to hold cryptocurrency and therefore does not need to operate as a peer-to-peer network node, but may for example have a client/server relationship with the shared wallet service node 42. A shared wallet client application 411, preferably with secured memory 412 (in embodiments where private keys are to be held by the user) is used to communicate with the shared wallet service. In other embodiments, the user's public wallet 424 could be located at the shared wallet user node 41, in which case the shared wallet user node would need to have the full capabilities of a peer-to-peer network node for the cryptocurrency as described above.

The shared wallet service node 42 has a shared wallet service server 421 comprising the user public wallets 424 and the user private wallets 423, the private wallets being located in a logically protected private wallet space 425. As the shared wallet service node 42 is a node on the peer-to-peer cryptocurrency network it comprises the elements needed for such a node, such as data directory 35, with the shared wallet service server 421 having functions including that of the cryptocurrency client.

This structure enables a rich range of service possibilities for the user in addition to solving the refund problem associated with existing shared wallets. A typical use model would be for the user not to keep cryptocurrency in their public wallet, but transfer it to and from their private wallet (in an off-the-chain transaction) when received in or needed for an on-the-chain transaction. User funds could then be held in their private wallet or transferred to cold storage for additional security if not needed for either on-the-chain or off-the-chain transactions. While these off-the-chain transactions would not be publicly verified, there will of course be a trust relationship between the users and the service provider for the shared wallet service. This may be established contractually, and may involve a registration process (in which, for example, the user may need to provide various credentials to open an account with the shared wallet service provider).

Figure 5:
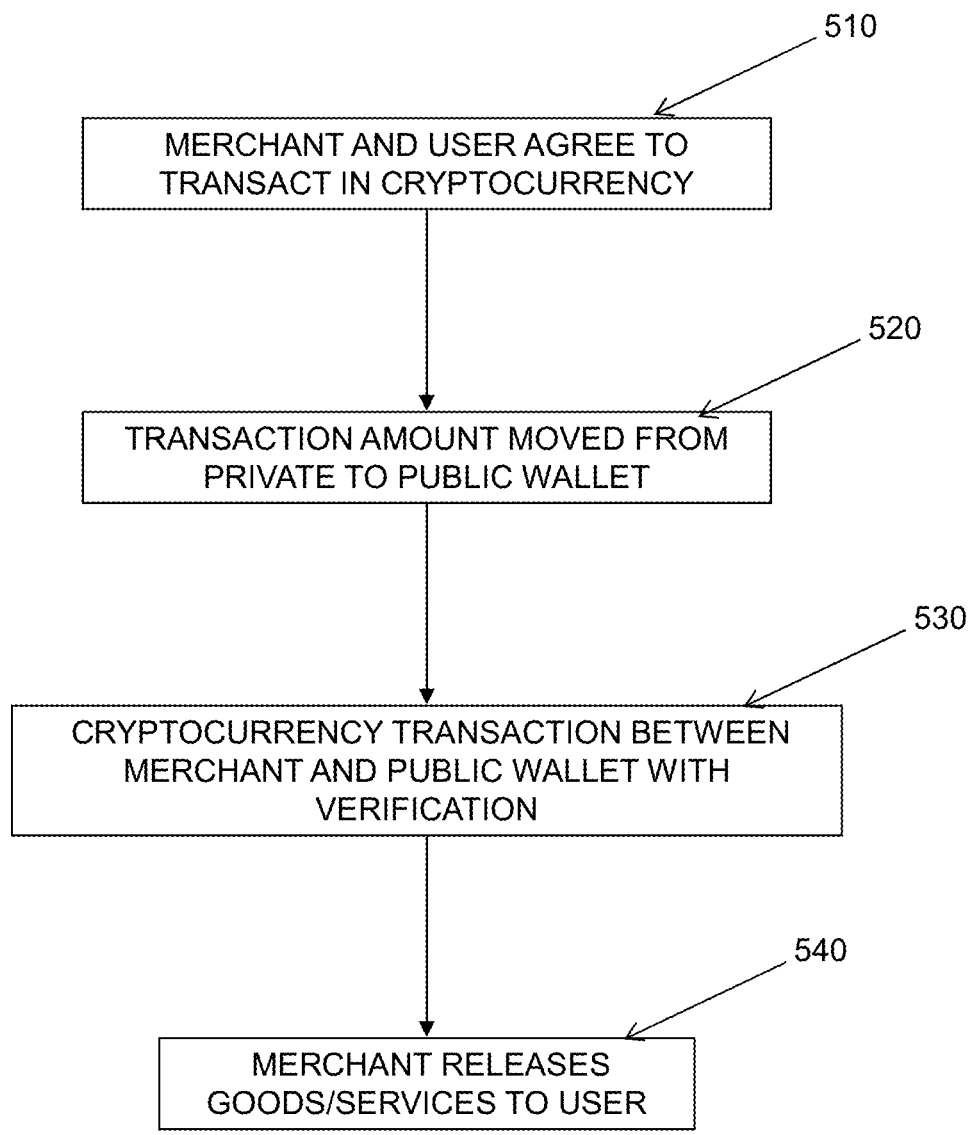
FIG. 5 shows exemplary currency flows in the infrastructure of FIG. 4.

FIG. 5 illustrates the steps of a typical transaction between a user of the shared wallet service and a merchant in the architecture of FIG. 4. The merchant and the user agree 510 to transact in the cryptocurrency. The user's public wallet will normally contain a low balance of cryptocurrency for security, in which case it will typically be necessary for the user to request the shared wallet service provider to move 520 an appropriate cryptocurrency balance from the user's private wallet to the user's public wallet in an off-the-chain transaction. This could be done by the user logging into to his or her account through any appropriate security protocol, such as cryptographically using key pairs generated through RSA or ECC. When a sufficient balance is present in the user's public wallet, the shared wallet service provider then performs 530 an on-the-chain cryptocurrency transaction with the merchant using the standard approach indicated above using the user's public wallet (the merchant provides a destination address, funds are sent to the destination address from the user's public address, the transaction is verified by mining and establishment in a block chain). The transaction can then be considered completed and the goods or service released 540 to the user.

Figure 6:
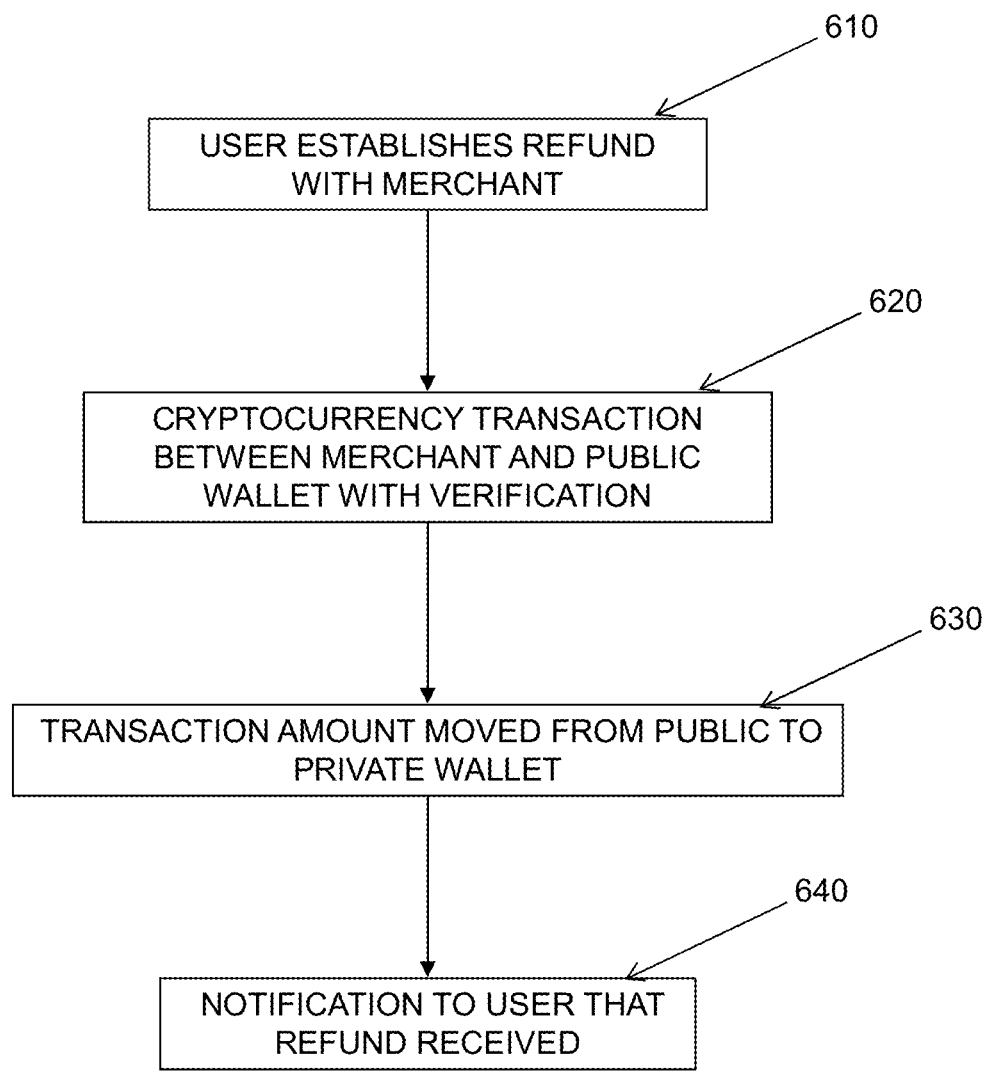
FIG. 6 shows steps in account management using the infrastructure of FIG. 4.

FIG. 6 illustrates the steps involved in refunding a transaction in the architecture of FIG. 4. The user establishes with the merchant that a refund is required 610. The merchant performs an on-the-chain cryptocurrency transaction 620 using the address of the user's public wallet as destination address. When the transaction is considered complete the balance in the user's public wallet may be transferred 630 to the user's private wallet in an off-the-chain transaction—this may be an automatic process performed by the shared wallet service provider without any need for user involvement (in which case there may then be notification 640 from the shared wallet service provider to the user that an incoming transaction has been verified and processed).

This arrangement allows for a rich range of additional services not possible in other cryptocurrency architectures, as will be discussed below.

As noted above, transactions between users holding accounts with the shared wallet service provider can take place off-the-chain, both parties being assured of the correctness of the transaction by virtue of their trust relationship with the shared wallet service provider. This encourages merchants as well as private users to hold accounts with the shared wallet service providers. In that case, if a specific user and specific merchant wish to transact using a cryptocurrency, then one or both parties can simply notify the shared wallet service using credentials that will allow the shared wallet service to establish that both user and merchants have an account and that they have authorised the shared wallet service to transact on their behalf. The transfer can then be made using standard transaction architecture protocols as used for transferring a balance of any currency.

Not only does this arrangement allow the user good security in handling cryptocurrency (in addition to the user's private wallet being protected by keys specific to the user, it may also be possible to move funds not likely to be needed for outgoing transactions to cold storage with additional security protocols, such as use of three or more private keys to unlock funds), it allows the user to receive additional services from the shared wallet service provider. For example, the user's spending habits or characteristics of the transaction (originating IP address, browser type etc.) can be considered in determining whether a given transaction is legitimate or a potential fraud risk. Transaction limits or other controls can be provided in the same manner as for payment devices operating with "fiat" currency. The shared wallet service provider may in addition to currency exchange services provide loans in cryptocurrency to the private wallet account and may insure against user loss in transactions.

While the embodiments discussed above relate to cryptocurrency, it should be noted that details of a cryptocurrency transaction are only one example of a valuable message, and that the infrastructure described here is more generally applicable to transfer of information with verified transmission but secure retention of original or significant information content. The block chain verification mechanism may be used for multiple purposes (such as timestamping of an information transfer), several being described at https://en.bitcoin.it/wiki/Alternative_chain, entitled "Alternative chain", herein incorporated by reference, and embodiments of the disclosure as described above may be used for such purposes.

The invention claimed is:

1. A method for performing a cryptocurrency transaction with verification from a first party to a second party using suitably programmed computing apparatus, the method comprising:
    receiving, by a service provider computing device, a cryptocurrency balance transfer request from a first party computing device, the cryptocurrency balance transfer request being a request to transfer a cryptocurrency balance from a first party private address associated with the first party to a first party shared public address used to transact cryptocurrency of a plurality of users of a shared wallet service including the first party, the first party shared public address located in the shared wallet service on the service provider computing device and the first party private address located in a logically protected space of the shared wallet service;
    performing the cryptocurrency balance transfer by sending the cryptocurrency balance from the first party private address to the first party shared public address, the cryptocurrency balance transfer being a private off-blockchain transaction between the first-party and the shared wallet service;
    performing the cryptocurrency transaction by sending the cryptocurrency balance from the first party shared public address to a second party address associated with a second party computing device, wherein the cryptocurrency transaction is provided for public recordal on a block of a block chain for verification; and
    receiving, by the service provider computing device, a refund of the cryptocurrency balance of the cryptocurrency transaction from the second party address to the first party shared public address.

2. The method of claim 1, wherein the service provider provides the first party private address and a plurality of private addresses for other parties in the logically protected space of the shared wallet service.

3. The method of claim 2, wherein the first party private address is private to the first party and the service provider.

4. The method of claim 3, wherein the first party private address is maintained private to the first party and the service provider by a cryptographic protocol.

5. The method of claim 1, comprising:
    sending, by the service provider computing device, the cryptocurrency balance from the first party shared public address to the first party private address.

6. A system for performing a cryptocurrency transaction, comprising:
    a processor and a memory including instructions that, when executed by the processor, cause the processor to:
    host, in an address space, a private address associated with a first party and a shared public address used to transact cryptocurrency of a plurality of users of a shared wallet service including the first party, the first party shared public address located in the shared wallet service on the processor and the first party private address located in a logically protected space of the shared wallet service;
    receive a cryptocurrency balance transfer request from a first party computing device, the cryptocurrency balance transfer request being a request to transfer a cryptocurrency balance from the first party private address to the first party shared public address;
    send information from the first party private address to the first party shared public address in a private off-blockchain transaction between the first-party and the shared wallet service;
    perform the cryptocurrency transaction by sending the cryptocurrency balance from the first party shared public address to a second party address associated with a second party computing device and to provide the cryptocurrency transaction for public recordal on a block of a block chain for verification; and
    receive a refund of the cryptocurrency balance of the cryptocurrency transaction from the second party address to the first party shared public address.

7. The system of claim 6, wherein the first party private address and a plurality of private addresses for other parties are stored in the logically protected space of the shared wallet service.

8. The system of claim 6, wherein the first party private address is maintained private to the first party and the service provider by a cryptographic protocol.

9. The system of claim 6, the instructions further causing the processor to:
    send the cryptocurrency balance from the first party shared public address to the first party private address.

10. A computer program product for performing a cryptocurrency transaction, the computer program product comprising:
    a non-transitory computer-readable storage medium having program instructions embodied therewith, the program instructions executable by a computer to cause the computer to:
    receive, by a service provider computing device, a cryptocurrency balance transfer request from a first party computing device, the cryptocurrency balance transfer request being a request to transfer a cryptocurrency balance from a first party private address associated with the first party to a first party shared public address used to transact cryptocurrency of a plurality of users of a shared wallet service including the first party, the first party shared public address located in the shared wallet service on the service provider computing device and the first party private address located in a logically protected space of the shared wallet service perform the cryptocurrency balance transfer by sending a cryptocurrency balance from the first party private address to the first party shared public address, the cryptocurrency balance transfer being a private off-blockchain transaction between the first-party and the shared wallet service;

perform the cryptocurrency transaction by sending the cryptocurrency balance from the first party shared public address to a second party address associated with a second party computing device, wherein the cryptocurrency transaction is provided for public recordal on a block of a block chain for verification; and receive, by the service provider computing device, a refund of the cryptocurrency balance of the cryptocurrency transaction from the second party address to the first party shared public address.

11. The computer program product of claim 10, wherein the service provider provides the first party private address and a plurality of private addresses for other parties in the logically protected space of the shared wallet service.

12. The computer program product of claim 10, wherein the first party private address is private to the first party and the service provider.

13. The computer program product of claim 12, wherein the first party private address is maintained private to the first party and the service provider by a cryptographic protocol.

14. The computer program product of claim 10, comprising program instructions to:

send, by the service provider computing device, the cryptocurrency balance from the first party shared public address to the first party private address.

15. The method of claim 5, wherein the sending of the cryptocurrency balance from the first shared party public address to the first party private address is an automatic process.

16. The method of claim 1, comprising:

generating, by the service provider computing device, a notification of the refund; and transmitting, by the service provider computing device, the notification of the refund to the first party computing device.

17. The method of claim 1, comprising:

transferring the cryptocurrency balance from a first party cold storage to the first party private address, the first party cold storage maintained private to the first party private address by a cryptographic protocol.

18. The method of claim 5, comprising:

transferring the cryptocurrency refund balance from the first party private address to a first party cold storage, the first party cold storage maintained private to the first party private address by a cryptographic protocol.

\* \* \* \* \*